United States Patent
Witt, Jr. et al.

(10) Patent No.: US 11,999,312 B2
(45) Date of Patent: Jun. 4, 2024

(54) INTEGRATED FASTENER/STIFFENER PIECES FOR AIRBAG MOUNTING

(71) Applicant: Autoliv ASP, Inc., Ogden, UT (US)

(72) Inventors: John F. Witt, Jr., Clinton Township, MI (US); Jason Mark Ibarra, Bloomfield Hills, MI (US); Huseyin Fethi Akbay, Rochester, MI (US); Jie Ji, Shanghai (CN)

(73) Assignee: Autoliv ASP, Inc., Ogden, UT (US)

( * ) Notice: Subject to any disclaimer, the term of this patent is extended or adjusted under 35 U.S.C. 154(b) by 302 days.

(21) Appl. No.: 17/153,784

(22) Filed: Jan. 20, 2021

(65) Prior Publication Data

US 2022/0227322 A1    Jul. 21, 2022

(51) Int. Cl.
*B60R 21/213* (2011.01)
*B60R 21/232* (2011.01)

(52) U.S. Cl.
CPC .......... *B60R 21/213* (2013.01); *B60R 21/232* (2013.01)

(58) Field of Classification Search
CPC ............................. B60R 21/232; B60R 21/213
See application file for complete search history.

(56) References Cited

U.S. PATENT DOCUMENTS

| | | | |
|---|---|---|---|
| 5,921,510 A * | 7/1999 | Benoit ................. | F16L 3/2334 248/68.1 |
| 6,851,710 B2 * | 2/2005 | Wong .................... | B60R 21/213 280/743.2 |
| 7,100,939 B2 * | 9/2006 | Blake, III ............. | B60R 21/232 280/730.2 |
| 7,320,477 B2 * | 1/2008 | Kawabe ................ | B60R 21/232 280/730.2 |
| 7,370,878 B2 * | 5/2008 | Nakazawa ............ | B60R 21/213 16/2.5 |
| 7,527,287 B2 * | 5/2009 | Kjell ..................... | B60R 21/201 280/730.2 |
| 7,780,187 B2 * | 8/2010 | Minamikawa ........ | B60R 21/213 24/458 |
| 9,487,175 B2 * | 11/2016 | Noma ................... | B60R 21/214 |
| 9,505,368 B2 * | 11/2016 | Morrell ................. | B60R 21/213 |
| 9,604,592 B2 * | 3/2017 | Desai .................... | B60R 21/213 |
| 9,789,837 B2 * | 10/2017 | Ma ........................ | B60R 21/232 |
| 11,192,518 B2 * | 12/2021 | Kang .................... | B60R 21/213 |
| 11,260,821 B2 * | 3/2022 | Valles Rey ........... | B60R 21/232 |
| 11,279,310 B1 * | 3/2022 | Uribe .................... | B60R 21/232 |
| 11,590,919 B1 * | 2/2023 | Patton ............... | B60R 21/23138 |
| 2020/0086819 A1 * | 3/2020 | Landis .................. | B60R 21/213 |

* cited by examiner

*Primary Examiner* — Jason D Shanske
*Assistant Examiner* — Joselynn Y Sliteris
(74) *Attorney, Agent, or Firm* — Matthew D. Thayne; Thayne and Davis LLC

(57) ABSTRACT

Airbag assemblies, such as inflatable curtain airbag assemblies, comprising integrated fastener/stiffener pieces, such as stiffener plates combined with pushpins extending therefrom. In some embodiments, a mounting plate for mounting an inflatable curtain airbag assembly to a vehicle may comprise a plate having a stiffness greater than a stiffness of a tab of an inflatable curtain airbag assembly to which it is attached. An opening may be formed in the plate, the opening being configured to receive a first fastener therethrough. A second fastener, such as a non-threaded fastener, may be fixedly and/or integrally coupled with the plate and may extend from one side of the plate.

16 Claims, 5 Drawing Sheets

INTEGRATED FASTENER/STIFFENER PIECES FOR AIRBAG MOUNTING

SUMMARY

Airbag cushions, such as inflatable curtain airbag cushion modules, for example, are often mounted using two fasteners, both of which may extend through a relatively flexible or non-stiff material, such as a tab or stack of tabs often made of fabric. It is also often the case that, when stiffening elements are used, they are separate from the fasteners and often interfere with fastening elements during use.

There are several drawbacks with such current configurations. For example, providing separate pushpins or other fasteners and stiffeners, or no stiffeners at all, result in drooping during installation, difficulties aligning various openings for mounting the airbag module, and retention problems, often due to overlapping pushpin/fastener heads and adjacent bolts or other fastening elements.

The present inventors have therefore determined that it would be desirable to provide apparatus, systems and methods that overcome one or more of the foregoing limitations and/or other limitations of the prior art. In some embodiments, the inventive concepts disclosed herein may therefore provide for an integrated pushpin or other fastener along with a stiffening element, which may be in the form of a plate in some embodiments, together as a unit.

In a more particular example of a mounting piece, such as a mounting plate, for mounting an inflatable curtain airbag assembly to a vehicle, the mounting piece/plate may comprise a rigid plate configured to be coupled to a flexible tab of an inflatable curtain airbag assembly or another airbag module/assembly. An opening may be formed in the plate, the opening being configured to receive a fastener, such as a bolt or another threaded fastener, therethrough. A non-threaded fastener may be fixedly coupled with the plate and may extend from one side of the plate.

In some embodiments, the non-threaded fastener may comprise a pushpin or another self-holding, insertable retaining device. In some such embodiments, at least a portion of the pushpin may be resiliently flexible such that the pushpin is configured to allow for partial deformation thereof as the pushpin extends through an opening of a vehicle and resume its initial shape after extending through the opening to temporarily affix the inflatable curtain airbag assembly to the vehicle during assembly. In some such embodiments, the pushpin may comprise a plurality of resiliently flexible, concentric flaps.

In some embodiments, the plurality of flaps may comprise a first set of adjacent semi-circular flaps and a second set of adjacent semi-circular flaps. The first set of flaps may be spaced apart from the second set of flaps by opposing slits.

In some embodiments, the non-threaded fastener may be spaced apart from the opening to allow for a portion of a washer coupled with the bolt to be positioned between the non-threaded fastener and the opening without overlapping.

In an example of an inflatable curtain airbag assembly according to some embodiments, the assembly may comprise an airbag module comprising an inflatable curtain airbag cushion. The assembly may further comprise a mounting item, such as a mounting plate, which may be configured to couple the airbag module within a vehicle. The mounting plate may comprise at least one opening and a non-threaded fastener, such as a pushpin, fixedly coupled to the mounting plate and extending from one side of the mounting plate.

Some embodiments may further comprise a mounting tab, such as a fabric mounting tab in some embodiments, extending from the airbag module. The mounting plate may be coupled to the mounting tab and may have a greater stiffness than the mounting tab.

In some embodiments and implementations, the mounting plate may be sewn to the mounting tab. In some such embodiments and implementations, the mounting plate may comprise a plurality of adjacent openings and the mounting plate may be sewn to the mounting tab along a line extending along and in between one or more of the plurality of adjacent openings.

In some embodiments, the at least one opening comprises an at least substantially centrally positioned opening, which may be configured to receive a fastener, such as a bolt, therethrough to permanently mount the airbag module to the vehicle.

In some embodiments, the at least one opening may further comprise a plurality of adjacent openings extending about at least a portion of a periphery of the at least substantially centrally positioned opening. In some such embodiments, the mounting plate may be sewn to a portion of the airbag module along a line extending along and in between at least a subset of the plurality of adjacent openings.

In some embodiments, the non-threaded fastener may be spaced apart from the at least substantially centrally positioned opening to allow for a portion of a washer coupled with the bolt to be positioned between the non-threaded fastener and the at least substantially centrally positioned opening without overlapping.

In some embodiments, the non-threaded fastener may comprise a resilient pushpin. In some embodiments, the pushpin may be fixedly coupled with or, in some such embodiments, integrally formed as part of the mounting plate.

In an example of a method for mounting an inflatable curtain airbag module within a vehicle, the method may comprise aligning a first opening of a stiffener piece of an inflatable curtain airbag module with a first opening of a vehicle and inserting a first fastener into a second opening of the vehicle. The first fastener may be fixedly coupled with the stiffener piece and/or the first fastener may be non-threaded. The first fastener may be configured to hold the inflatable curtain airbag module in place temporarily without any additional fasteners or coupling features. The method may further comprise inserting a second fastener into the first opening of the stiffener piece and into a second opening of the vehicle to mount the inflatable curtain airbag module more permanently to the vehicle.

Some implementations may further comprise sewing the stiffener piece to a tab, such as a fabric tab, of the inflatable curtain airbag module.

In some implementations, the stiffener piece may comprise a plurality of adjacent openings extending about the first opening of the stiffener piece. In some such implementations, the step of sewing the stiffener piece to the fabric tab may comprise sewing the stiffener piece to the fabric tab along portions of the stiffener piece extending between adjacent openings of the plurality of adjacent openings.

In some implementations, the first fastener may comprise a resilient pushpin, and the step of inserting a first fastener into a second opening of the vehicle may comprise pushing the resilient pushpin into the first opening of the vehicle.

In some implementations, the second fastener may comprise a threaded bolt, and the step of inserting a second fastener into the first opening of the stiffener piece and into a second opening of the vehicle to mount the inflatable curtain airbag module to the vehicle may comprise inserting the threaded bolt through a washer, through the first opening of the stiffener piece, and through the second opening of the vehicle.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
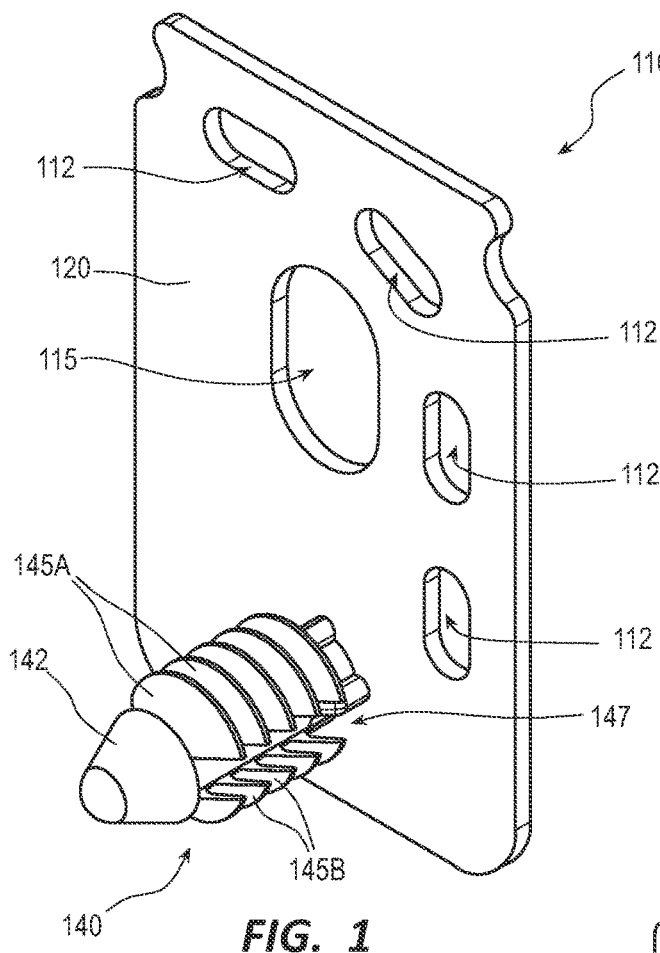
FIG. 1 is a front perspective view of an integrated fastener plate for mounting an airbag module according to some embodiments.
Figure 2:
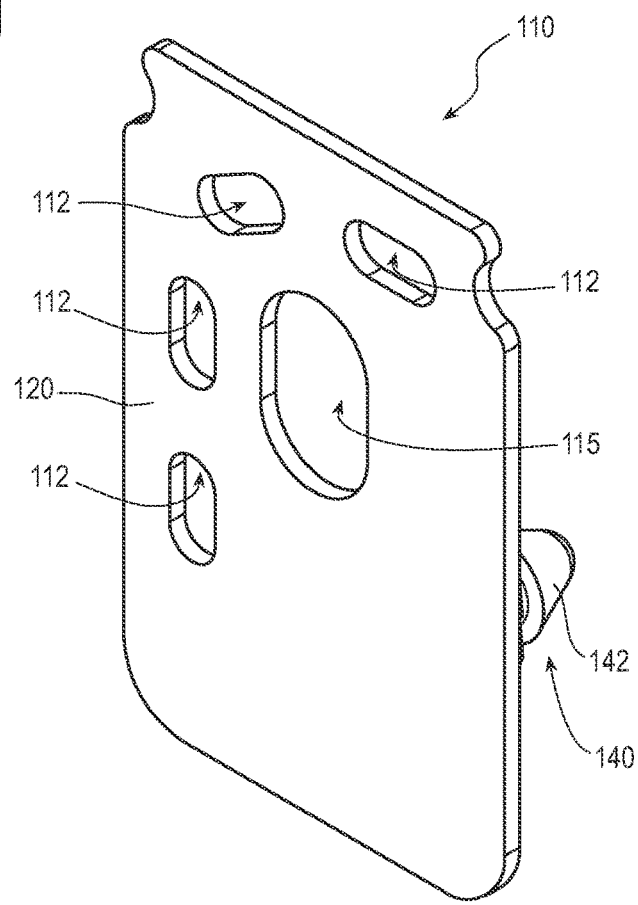
FIG. 2 is a rear perspective view of the integrated fastener plate of FIG. 1.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIGS. 1-7 depict various views of an integrated fastener/stiffener piece 110 for use in mounting an airbag module, such as, in preferred embodiments and implementations, an inflatable curtain airbag module, as shown and described further in connection with subsequent figures. In the depicted embodiments, piece 110 comprises a stiffener or plate portion 120, which is preferably flat but may have another shape in alternative embodiments and a fixedly coupled fastener 140. As described throughout this disclosure, plate/stiffener portion 120 may, in some embodiments, be coupled with an element of an airbag module having lesser stiffness, such as a fabric tab or stack of fabric tabs, and fastener 140 may be configured to be inserted into an opening of a portion of a vehicle to facilitate assembly. For example, fastener 140 may be used to temporarily mount the airbag module and align one or more openings formed in the plate/stiffener portion 120 to facilitate a more permanent mounting of the module, which may take place, for example, by way of a bolt and/or washer or another suitable secondary fastener.

Because in preferred embodiments fastener 140 is rigidly coupled with plate portion 120, such as by being integrally formed therewith in some such embodiments, preferably fastener 140 comprises a non-threaded fastener. Thus, in the depicted embodiment, fastener 140 comprises a set of concentric flaps that may be configured to deform upon entry through a suitable fastener opening, and then resume a previous shape to maintain the integrated fastener/stiffener piece 110, along with the accompanying airbag module, in a stable, fixed position to allow for more permanent coupling means to be applied.

Figure 3:
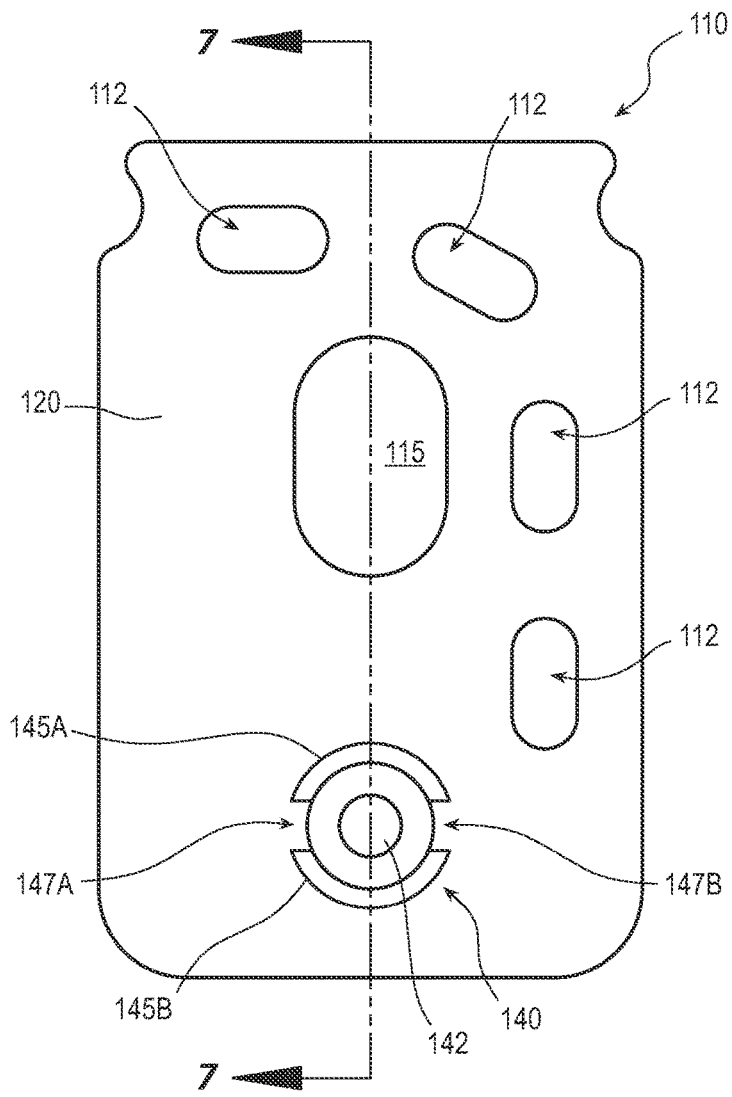
FIG. 3 is a front elevation view of the integrated fastener plate of FIGS. 1 and 2.
Figure 4:
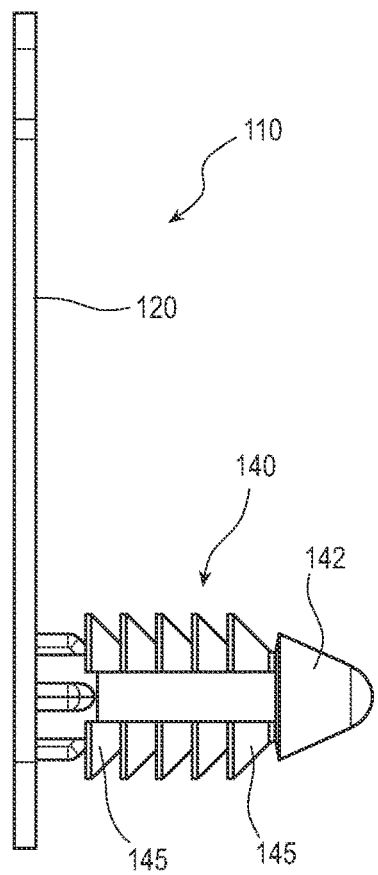
FIG. 4 is a side elevation view of the integrated fastener plate of FIGS. 1-3.
Figure 5:
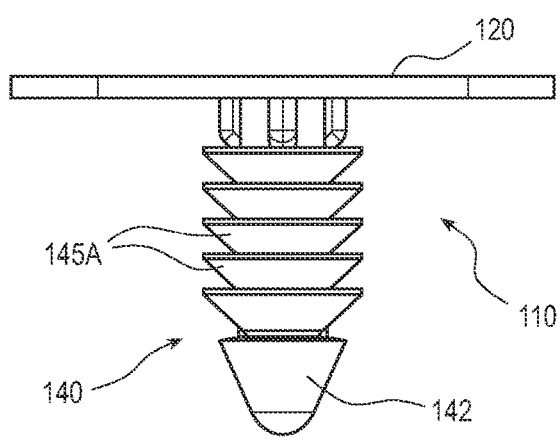
FIG. 5 is a top plan view of the integrated fastener plate of FIGS. 1-4.
Figure 6:
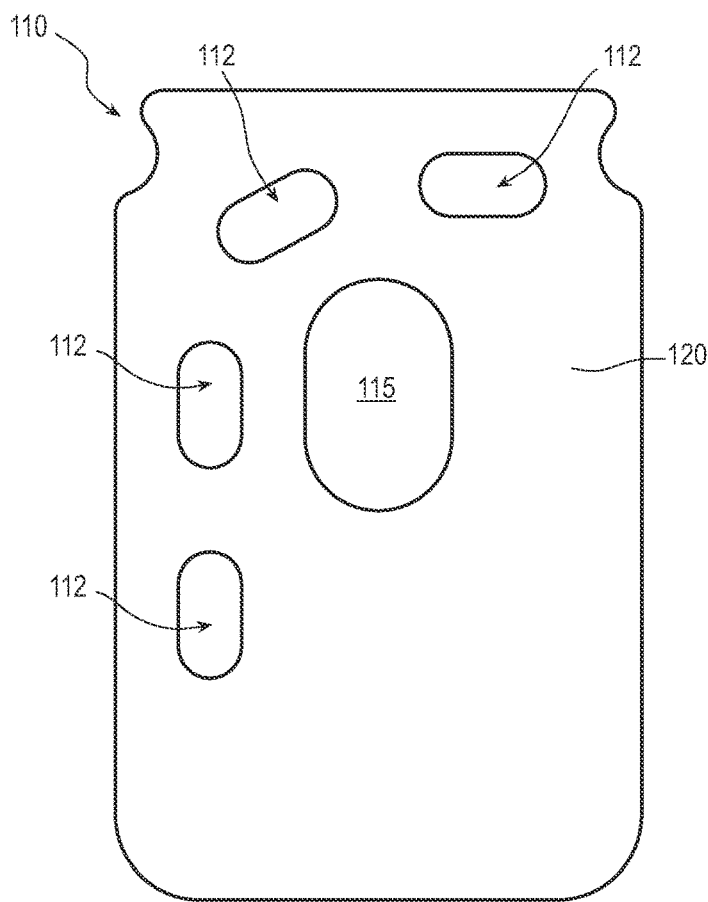
FIG. 6 is a rear elevation view of the integrated fastener plate of FIGS. 1-5.
Figure 7:
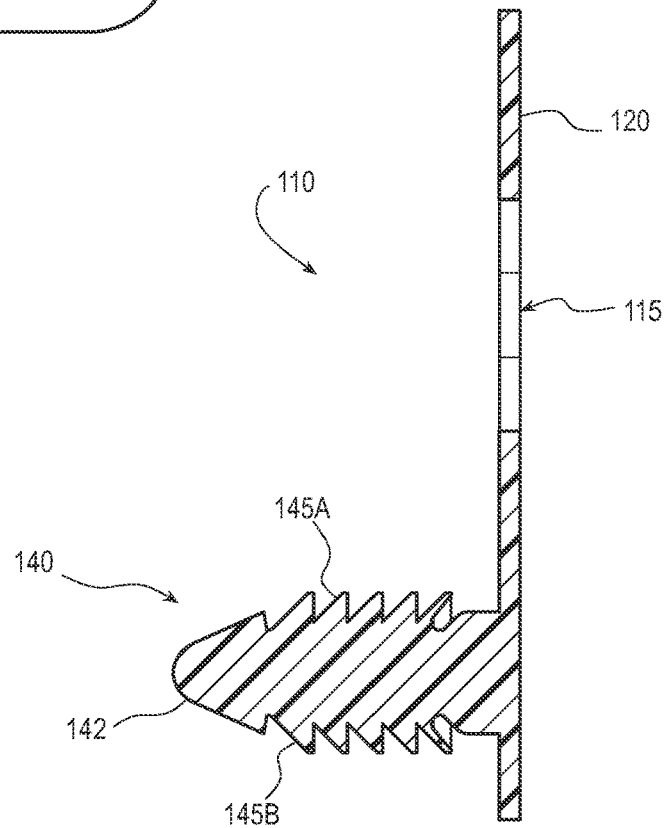
FIG. 7 is a cross-sectional view taken along line 7-7 in FIG. 3.

In the depicted embodiment, fastener 140 comprises a pushpin defined, in part, by two sets of semicircular flaps both sets of which define the aforementioned concentric flaps. Thus, an upper set of flaps 145A is provided and spaced apart from a lower set of flaps 145B. Opposing slits 147 are formed to provide this spacing, which may allow for additional resilient flexing to take place during insertion. More particularly, as shown in FIG. 3 a first slit 147A is formed on a first side of fastener 140 and a second slit 147B is formed on a second side of fastener 140 opposite the first side, both of which may extend through each of the adjacent flaps 145.

Fastener/pushpin 140 further comprises a pointed noise 142. As best seen in FIG. 1, each of the flaps 145 may be angled towards plate portion 120 if desired, which may facilitate ease of entry of fastener 140 through an opening and inhibit movement in the opposite direction following such entry. Nose 142 may be angled in the same, or a similar manner, as shown in FIG. 1. In addition, the use of multiple flaps 145 may be desirable for some embodiments in that this may facilitate stable positioning of piece 110 through openings/holes of more than one depth.

A plurality of openings may also be formed in the plate portion 120 of integrated fastener/stiffener piece 110. In the depicted embodiment, these openings may consist of a first set of openings 112, which may be positioned about at least a portion or, in some cases, the entire, periphery of the plate portion 120 adjacent to one another with space in between. As will be shown in connection with later figures, these openings 112 may be used to facilitate coupling of piece 110 with an element from an airbag module having less stiffness, such as a fabric tab or stack of fabric tabs.

For example, stiffener piece 110 may, in some implementations, be sewn to such an element and the openings 112 may serve as relief aids during the sewing process. More particularly, openings 112 may serve as a path for the sew line to travel. Due to the nature of the material making up the plate portion 120—which may be, for example, comprise a relatively stiff thermoplastic material, a carbon fiber, a polymer composite material, or the like (in a more specific example, polyamide PA6)—the sewing needle or other attachment instrument may heat up and potentially fail during use. The openings 112 may also therefore provide relief during the sewing process to prevent or at least inhibit such results during sewing.

Openings 112 may serve other functions as well in certain embodiments. For example, the airbag module tabs to which they may be coupled are typically classified as a non-dimensionally stable material, so the presence of the openings 112 may allow this material to stretch, expand, and shrink in response to the forces encountered during attachment and during the lifecycle of the accompanying airbag module.

The other opening—opening 115—may be positioned in a more central location relative to the peripheral set of openings 112. Opening 115 may be configured to receive a more permanent, rigid, and/or strong fastener therethrough, such as a bolt, for example, in some cases along with a suitable washer. Thus, fastener 140 preferably comprises a non-threaded fastener (although it may comprise a threaded fastener that is rotatable with respect to plate portion 120 in alternative embodiments) and the fastener received through opening 115 comprises a threaded fastener (although a non-threaded fastener, such as a rivet, may be used in alternative embodiments).

Figure 8:
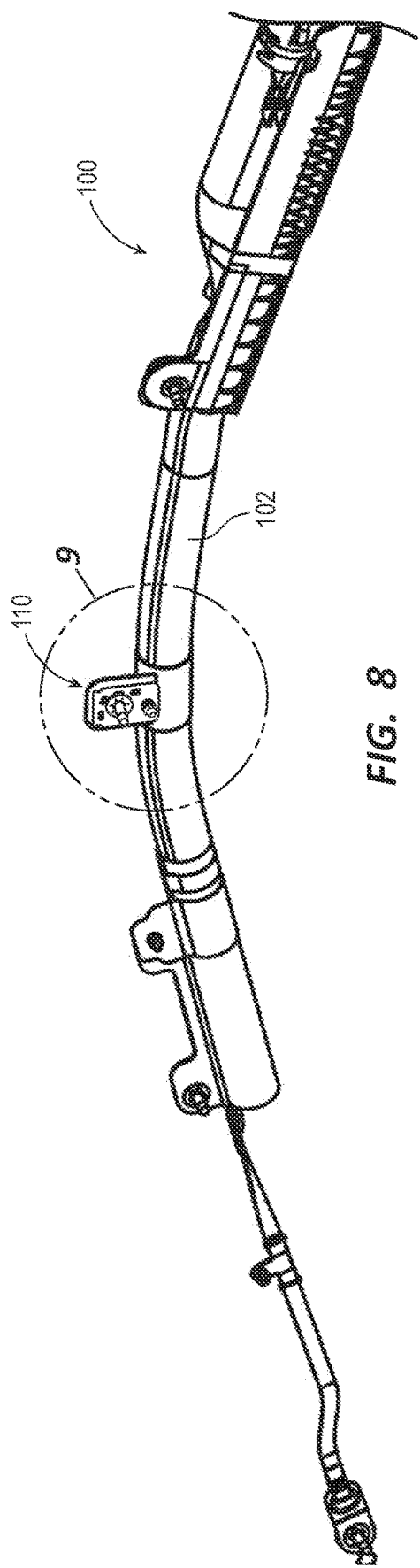
FIG. 8 is a perspective view of an inflatable curtain airbag assembly according to some embodiments.
Figure 9:
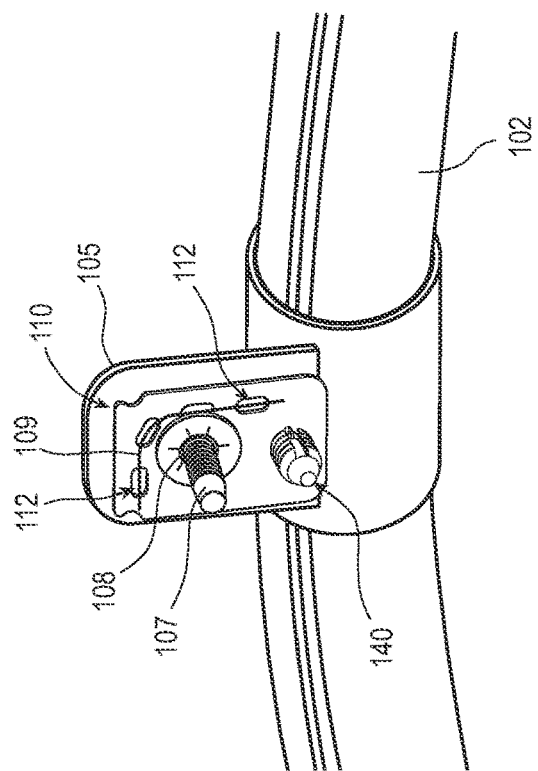
FIG. 9 is an expanded view of the portion of FIG. 8 illustrating an integrated fastener plate for mounting the inflatable curtain airbag assembly.

FIGS. 8 and 9 depict an inflatable curtain airbag assembly 100 utilizing an integrated stiffener/pushpin 110 according to some embodiments. As shown in these figures, and as best seen in FIG. 9, inflatable curtain airbag module 100 comprises an airbag module 102, which may include an airbag cushion, inflator, and various other elements, as those of ordinary skill in the art will appreciate. In addition, one or more tabs 105 extend from airbag module 102, which may be used to facilitate hanging/mounting of airbag module 102 within a vehicle.

Integrated stiffener/pushpin 110 is shown coupled to tab 105—which, as mentioned above, may comprise a fabric tab or another material lacking the stiffness of integrated stiffener/pushpin 110—by way of a sew line 109, which extends in between adjacent openings 112 and within openings 112 themselves. By coupling a piece having greater stiffness than tab 105, drooping of tab 105 may be prevented, which may reduce or eliminate the need to manually lift the tab 105 and position fastener 107 because integrated fastener/pushpin 110 keeps tab 105 extending upward to allow installers to simply align fastener 107 with the correct opening/position within a vehicle, which may already be presented for direct entry therein by way of use of fastener/pushpin 110.

FIG. 9 also depicts fastener/pushpin 110. As previously mentioned, in preferred embodiments and implementations, fastener/pushpin 110 is configured to be non-rotatably pushed into an opening formed within a vehicle, such as an opening within vehicle sheet metal. This may allow airbag module 100 to be temporarily mounted within a vehicle to allow for further, more permanent, mounting to take place.

Figure 10:
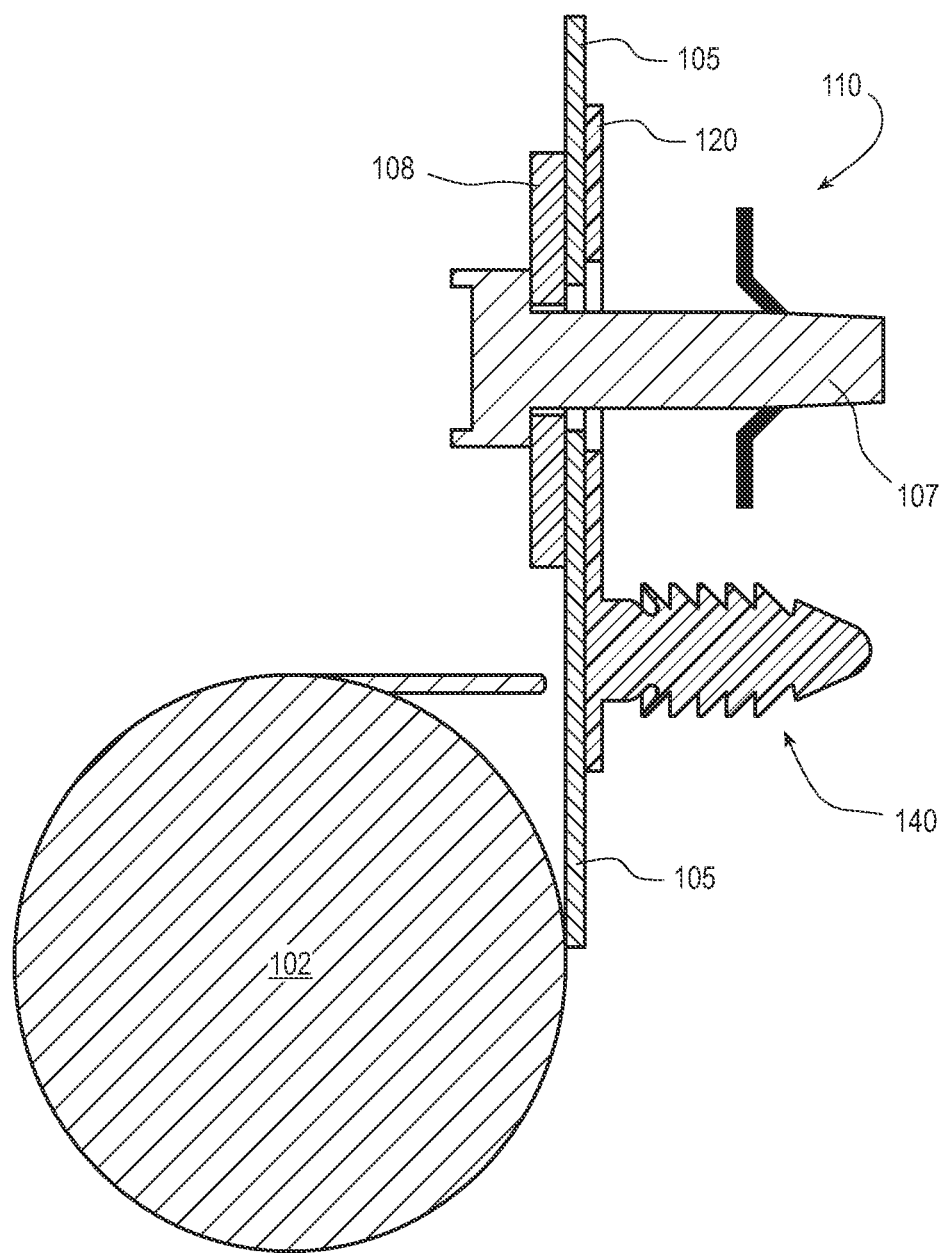
FIG. 10 is a cross-sectional view of the integrated fastener plate and adjacent inflatable curtain airbag assembly components following mounting with an alternative location of the retaining washer.

For example, some embodiments may comprise or be used in conjunction with another fastener, such as bolt 107. A retaining washer 108 may also be provided if desired, which in some cases may be used to retain the bolt 107 within the tab 105 and stiffener/pushpin 110 to facilitate ease of mounting/assembly. Preferably, the spacing between opening 115 and fastener 140 is such that fastener 107 is presented for mounting in a vehicle opening at a precise distance from the hole through which fastener 140 extends and such that washer 108 does not interfere with fastener 140, as best seen in the cross-sectional view of FIG. 10.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:
1. An inflatable curtain airbag assembly, comprising:
   an airbag module comprising an inflatable curtain airbag cushion; and
   a mounting plate configured to couple the airbag module within a vehicle, wherein the mounting plate comprises:
      at least one opening; and a non-threaded fastener extending from one side of the mounting plate, wherein the non-threaded fastener comprises a self-holding, insertable retaining device configured to hold the inflatable curtain airbag cushion in place temporarily without any additional fasteners or coupling features, and wherein the non-threaded fastener comprises an integral extension of the mounting plate; and a mounting tab extending from the airbag module, wherein the mounting plate is coupled to the mounting tab, wherein the mounting plate has a greater stiffness than the mounting tab, wherein the mounting plate is sewn to the mounting tab, wherein the mounting plate comprises a plurality of adjacent openings, and wherein the mounting plate is sewn to the mounting tab with the mounting tab positioned behind the plurality of adjacent openings.

2. The inflatable curtain airbag assembly of claim 1, wherein the mounting tab comprises a fabric mounting tab.

3. The inflatable curtain airbag assembly of claim 1 wherein the mounting plate is sewn to the mounting tab along a line extending along and in between at least a subset of the plurality of adjacent openings.

4. The inflatable curtain airbag assembly of claim 1, wherein the at least one opening comprises an at least substantially centrally positioned opening configured to receive a bolt therethrough to permanently mount the airbag module to the vehicle.

5. The inflatable curtain airbag assembly of claim 4, wherein the at least one opening further comprises the plurality of adjacent openings extending about at least a portion of a periphery of the at least substantially centrally positioned opening, and wherein the mounting plate is sewn to a portion of the airbag module along a line extending along and in between at least a subset of the plurality of adjacent openings.

6. The inflatable curtain airbag assembly of claim 4, further comprising a washer coupled with the bolt, wherein the non-threaded fastener is spaced apart from the at least substantially centrally positioned opening to allow for a portion of the washer to be positioned between the non-threaded fastener and the at least substantially centrally positioned opening without overlapping with the non-threaded fastener.

7. The inflatable curtain airbag assembly of claim 1, wherein the non-threaded fastener comprises a resilient pushpin, and wherein the pushpin is integrally formed as part of the mounting plate.

8. The inflatable curtain airbag assembly of claim 1, wherein the non-threaded fastener comprises a circular shape in cross-section, at least in part.

9. The inflatable curtain airbag assembly of claim 8, wherein the non-threaded fastener comprises a pushpin, and wherein at least a portion of the pushpin is resiliently flexible such that the pushpin is configured to allow for partial deformation thereof as the pushpin extends through an opening of a vehicle and resume an initial shape of the pushpin after extending through the opening to temporarily affix the inflatable curtain airbag assembly to the vehicle during assembly.

10. The inflatable curtain airbag assembly of claim 9, wherein the pushpin comprises a plurality of resiliently flexible, concentric flaps.

11. The inflatable curtain airbag assembly of claim 10, wherein the plurality of flaps comprises a first set of adjacent semi-circular flaps and a second set of adjacent semi-circular flaps, wherein the first set of flaps is spaced apart from the second set of flaps by opposing slits.

12. A method for mounting an inflatable curtain airbag module within a vehicle, the method comprising the steps of:
aligning a first opening of a stiffener piece of the inflatable curtain airbag module with a first opening of a vehicle;
inserting a first fastener into a second opening of the vehicle, wherein the first fastener is fixedly coupled with the stiffener piece, wherein the first fastener is non-threaded, wherein the first fastener is configured to hold the inflatable curtain airbag module in place temporarily without any additional fasteners or coupling features, and wherein the first fastener comprises a set of concentric flaps configured to resiliently deform; and
inserting a second fastener into the first opening of the stiffener piece and into the first opening of the vehicle to mount the inflatable curtain airbag module to the vehicle; and
sewing the stiffener piece to a fabric tab of the inflatable curtain airbag module.

13. The method of claim 12, wherein the stiffener piece comprises a plurality of adjacent openings extending about the first opening of the stiffener piece, and wherein the step of sewing the stiffener piece to the fabric tab comprises sewing the stiffener piece to the fabric tab along portions of the stiffener piece extending between adjacent openings of the plurality of adjacent openings.

14. The method of claim 12, wherein the first fastener comprises a resilient pushpin, and wherein the step of inserting a first fastener into a second opening of the vehicle comprises pushing the resilient pushpin into the second opening of the vehicle.

15. The method of claim 14, wherein the second fastener comprises a threaded bolt, and wherein the step of inserting a second fastener into the first opening of the stiffener piece and into the first opening of the vehicle to mount the inflatable curtain airbag module to the vehicle comprises inserting the threaded bolt through a washer, through the first opening of the stiffener piece, and through the first opening of the vehicle.

16. The method of claim 12, wherein the first fastener comprises an integral extension of the stiffener piece.

* * * * *